United States Patent Office 3,493,326
Patented Feb. 3, 1970

---

3,493,326
DOUBLE SALT HAVING THE FORMULA
$(Na_2SO_4)_4 \cdot (Na_2CO_3)_9$
Edward Phelps Helvenston and Dorothy Ann Stewart, Corpus Christi, Tex., assignors to PPG Industries, Inc., a corporation of Pennsylvania
No Drawing. Filed Aug. 31, 1965, Ser. No. 484,087
Int. Cl. C01d 5/00, 7/00, 11/00
U.S. Cl. 23—50     2 Claims

ABSTRACT OF THE DISCLOSURE

The double salt $(Na_2SO_4)_4 \cdot (Na_2CO_3)_9$ is prepared from an aqueous solution at 93° C. to 100° C. saturated with respect to both $Na_2SO_4$ and $Na_2CO_3$ and containing 3.5 to 8 weight percent NaOH and 16.5 to 18 weight percent NaCl. It is a useful seeding material for removing sulfate impurities from a sodium carbonate solution.

---

This invention relates to a novel composition of matter.
A novel composition of matter has been discovered with a chemical composition in the range of $$10Na_2SO_4 \cdot 21\text{-}23Na_2CO_3$$

The pure double salt may be represented by the formula $(Na_2SO_4)_4 \cdot (Na_2CO_3)_9$.

Optical properties of the novel double salt were determined. It was found that the optic sign was negative with indices of refraction (white light) of $N\alpha = 1.440$, $N\beta = 1.500$ and $N\nu = 1.508$.

Table 1 compares X-ray diffraction powder patterns of the novel double salt, Burkeite ($Na_2CO_3 \cdot 2Na_2SO_4$) and a solid solution of sodium carbonate in Burkeite ($Na_2CO_3 \cdot Na_2SO_4$). The diffraction patterns were obtained with a diffractometer using copper radiation with a nickel filter. Comparison of the patterns shows that the powder pattern of the claimed compound is qualitatively similar to those of Burkeite and the Burkeite-sodium carbonate solid solution, but is quantitatively quite discrete having many more lines, a number of which are unique to the claimed compound.

TABLE 1.—X-RAY DIFFRACTION POWDER PATTERN DATA
Interplanar spacing: d; relative intensity: $I/I_1$

| $Na_2CO_3 \cdot 2Na_2SO_4$ (Burkeite) | | $Na_2CO_3 \cdot Na_2SO_4$ (Solid solution of $Na_2CO_3$ in Burkeite) | | $(Na_2SO_4)_4 \cdot (Na_2CO_3)_9$ (claimed compound) | |
|---|---|---|---|---|---|
| d | $I/I_1$ | d | $I/I_1$ | d | $I/I_1$ |
| 9.08 | 8 | 9.12 | 30 | 7.14 | 6 |
|  |  |  |  | 6.15 | 2 |
|  |  | 5.29 | 7 | 5.93 | 2 |
| 4.48 | 19 |  |  |  |  |
|  |  | 4.46 | 19 | 4.48 | 4 |
|  |  |  |  | 4.26 | 4 |
|  |  |  |  | 4.10 | 5 |
| 3.85 | 46 |  |  |  |  |
| 3.79 | 95 | 3.81 | 32 | 3.83 | 14 |
|  |  | 3.76 | 65 | 3.79 | 14 |
|  |  |  |  | 3.70 | 13 |
| 3.52 | 83 |  |  | 3.62 | 24 |
| 3.43 | 24 | 3.45 | 90 | 3.45 | 1 |
|  |  |  |  | 3.38 | 1 |
|  |  | 3.25 | 30 | 3.28 | 100 |
| 3.065 | 21 |  |  |  |  |
|  |  | 3.05 | 16 | 3.09 | 3 |
|  |  |  |  | 2.973 | 4 |
|  |  |  |  | 2.925 | 5 |
| 2.788 | 100 | 2.898 | 11 | 2.898 | 5 |
| 2.78 | 89 |  |  | 2.710 | 30 |
|  |  | 2.613 | 75 | 2.647 | 87 |
| 2.634 | 100 |  |  | 2.590 | 87 |
| 2.582 | 83 | 2.554 | 100 | 2.543 | 2 |
|  |  |  |  | 2.506 | 4 |
| 2.470 | 7 |  |  | 2.401 | 3 |
|  |  |  |  | 2.364 | 11 |
| 2.340 | 8 |  |  | 2.308 | 14 |
|  |  |  |  | 2.241 | 4 |
| 2.298 | 14 |  |  | 2.193 | 3 |
| 2.280 | 8 |  |  | 2.151 | 15 |
|  |  | 2.126 | 24 | 2.131 | 7 |
| 2.187 | 4 |  |  | 2.096 | 6 |
| 2.140 | 19 |  |  | 2.054 | 6 |
| 2.100 | 8 | 1.951 | 7 | 1.932 | 3 |
| 1.974 | 16 | 1.919 | 23 | 1.894 | 12 |
| 1.926 | 38 | 1.882 | 33 | 1.851 | 21 |
| 1.897 | 32 |  |  | 1.814 | 8 |
|  |  |  |  | 1.787 | 4 |
| 1.763 | 25 | 1.735 | 18 | 1.770 | 3 |
|  |  | 1.720 | 22 | 1.756 | 3 |
| 1.729 | 8 |  |  | 1.695 | 6 |
|  |  |  |  | 1.668 | 2 |
|  |  |  |  | 1.653 | 5 |
|  |  |  |  | 1.640 | 14 |
|  |  |  |  | 1.627 | 5 |
|  |  |  |  | 1.604 | 6 |
|  |  |  |  | 1.564 | 1 |
| 1.531 | 11 |  |  | 1.558 | 1 |
| 1.550 | 8 |  |  | 1.541 | 3 |
|  |  |  |  | 1.529 | 2 |
|  |  |  |  | 1.515 | 1 |
|  |  |  |  | 1.495 | 4 |
|  |  |  |  | 1.491 | 2 |
|  |  |  |  | 1.483 | 2 |
|  |  |  |  | 1.476 | 2 |
| 1.464 | 13 |  |  | 1.465 | 1 |
|  |  |  |  | 1.448 | 1 |
|  |  |  |  | 1.432 | 1 |
|  |  |  |  | 1.420 | 2 |
|  |  |  |  | 1.402 | 3 |
|  |  |  |  | 1.390 | 1 |
| 1.318 | 6 |  |  | 1.370 | 2 |
|  |  |  |  | 1.353 | 1 |

The double salt may be prepared as follows: to 695.5 grams of water, add 72.0 grams of NaOH, 5.5 grams of $Na_2SO_4$, 175.0 grams of NaCl, and 68.0 grams of $Na_2CO_3$. This solution is saturated with respect to all of the salts except NaOH at 93° C. To this solution add solids $Na_2SO_4$ and $Na_2CO_3$ to form a slurry containing about 20 percent solids. The added solids should contain from about 2 to about 2½, preferably about 2¼ moles of sodium carbonate for each mole of sodium sulfate. Equilibrate the slurry at 93° C. until a substantial portion of the solids are converted to the novel double salt claimed herein. Twenty hours of equilibration is usually adequate to convert most of the solid phase to the novel composition. The claimed double salt is conveniently recovered in a stable form by filtering rapidly at the temperature of the slurry, washing the solids with a 1:1 mixture by volume of glycerol and methanol to remove residual mother liquor, washing with methanol to displace the glycerol and drying at 110° C.

The claimed composition has been prepared from aqueous solutions saturated with respect to both $Na_2CO_3$ and $Na_2SO_4$ at temperatures between about 93° C. and about 100° C. in the presence of about 3.5 to about 8 percent by weight NaOH and between about 16.5 and about 18 percent by weight NaCl based on the weight of the solution. These specific conditions should not be taken as limiting the scope of the invention in any way. The claimed composition is stable over a wide range of temperatures and concentrations of individual solution components. One skilled in the art can readily determine other solution compositions and temperatures useful in the preparation of this compound. Although the solution should be saturated with respect to $Na_2SO_4$ and $Na_2CO_3$, it need not be saturated with respect to either NaCl or NaOH.

The claimed composition is useful as a seeding material for the removal of sulfate impurities from solutions of sodium carbonate. For example, sulfate impurities are often present at substantial levels in a process wherein chlorine cell liquor is carbonated to convert caustic soda to soda ash. Often, in such a process, the depleted mother liquor from which soda ash has been recovered is recycled back to the process. The depleted mother liquor may be mixed with fresh chlorine cell liquor for example, as feed to the carbonation process. The concentration of sulfate impurities builds up to unacceptable levels in such a cyclic system. When the carbonated liquor is evaporated to precipitate soda ash, the solubility limit of sodium sulfate may be exceeded. As a result, sodium sulfate precipitates as an impurity along with the soda ash. Sulfate is conveniently removed from such a system by introducing at an appropriate point in the system a small amount sufficient to function as a seed material of the claimed composition. The novel composition may be added as dry solid or in a slurry such as those resulting from the methods of preparation disclosed herein. Sulfate precipitates in the form of the claimed composition.

Seeding may be accomplished in accordance with well known techniques applicable generally in the chemical industry. The best point in the process to add the seeding material depends on the specifics of the process and is readily determined by those skilled in the art. Usually the seed material is introduced to an evaporator which is located prior to the system in the evaporator from which the soda ash is recovered. By removing sulfate from the system prior to the evaporation step wherein soda ash is recovered, soda ash low in sulfate content is recovered.

We claim:
1. A solid double salt having the formula

$$(Na_2SO_4)_4 \cdot (Na_2CO_3)_9$$

2. An aqueous slurry, the solid phase of which contains a solid double salt having the formula $$(Na_2SO_4)_4 \cdot (Na_2CO_3)_9$$

References Cited

UNITED STATES PATENTS

| | | | |
|---|---|---|---|
| 1,417,139 | 5/1922 | Burnham | 23—50 X |
| 1,824,360 | 9/1931 | Morse | 23—50 X |
| 1,899,310 | 2/1933 | Burnham | 23—50 X |
| 2,486,318 | 10/1949 | Newcome et al. | 23—50 X |

OTHER REFERENCES

Caspari: "Journal of the Chemical Soc.," vol. 125, 1924, pp. 2381–2387.

Khlapova: "Chemical Absts.," vol. 53, 1959, p. 4878.

Khlapova et al.: "Chemical Absts.," vol. 59, October 1963, p. 9382.

HERBERT T. CARTER, Primary Examiner

U.S. Cl. X.R.

23—63, 301